United States Patent [19]

Sporn

[11] Patent Number: 5,660,146
[45] Date of Patent: *Aug. 26, 1997

[54] PROTECTIVE SLEEVES FOR DOG HARNESSES

[76] Inventor: Joseph S. Sporn, 274 W. 86th St., New York, N.Y. 10024

[*] Notice: The term of this patent shall not extend beyond the expiration date of Pat. No. 5,359,964.

[21] Appl. No.: 537,470

[22] Filed: Oct. 2, 1995

Related U.S. Application Data

[63] Continuation-in-part of Ser. No. 280,195, Jul. 25, 1994, Pat. No. 5,471,953, which is a continuation-in-part of Ser. No. 222,034, Apr. 4, 1994, Pat. No. 5,485,810, which is a continuation-in-part of Ser. No. 194,720, Feb. 10, 1994, Pat. No. 5,359,964.

[51] Int. Cl.$^6$ .................................................. A01K 27/00
[52] U.S. Cl. ........................................ 119/792; 119/907
[58] Field of Search ............................... 119/792, 793, 119/865, 864, 858, 856, 907, 905; 54/65–68, 79.3, 23; 224/264

[56] References Cited

U.S. PATENT DOCUMENTS

| | | | |
|---|---|---|---|
| 3,435,867 | 4/1969 | Hyden | 224/264 |
| 4,570,424 | 2/1986 | Simpson | 54/23 |
| 4,695,496 | 9/1987 | Lee | 54/65 |
| 4,772,057 | 9/1988 | Harvey | 224/264 |

*Primary Examiner*—Christopher A. Bennett
*Attorney, Agent, or Firm*—Michael Ebert

[57] ABSTRACT

Protective sleeves for a leash-controllable dog harness provided with a pair of restraint cables that pass through the respective foreleg crotches of the dog and are coupled to the leash, whereby when the leash is strained, the cables then ride up the crotches to engage the sensitive foreleg pits and impose pressure thereon inducing the dog to release the strain in order to avoid the resultant discomfort. The sleeves which are mounted on the cables and conform thereto serve to prevent the cables from chafing or irritating the dog. Each sleeve is formed by a smooth inner liner through which the cable is slidable, and a soft, outer coat anchored on the liner, both the inner liner and the coat being fabricated of synthetic plastic materials which are inhospitable to fleas and other vermin so that vermin troublesome to dogs cannot breed or nest on the sleeve.

7 Claims, 1 Drawing Sheet

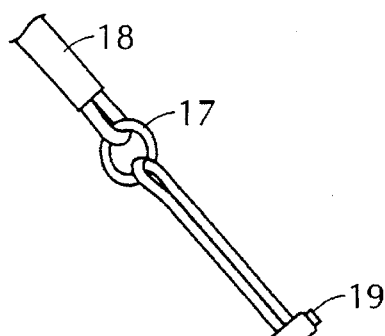
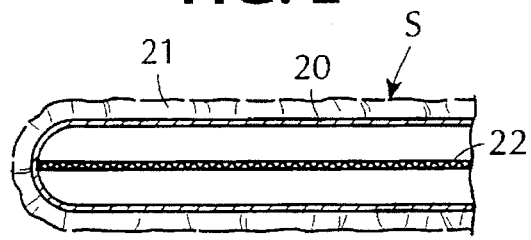
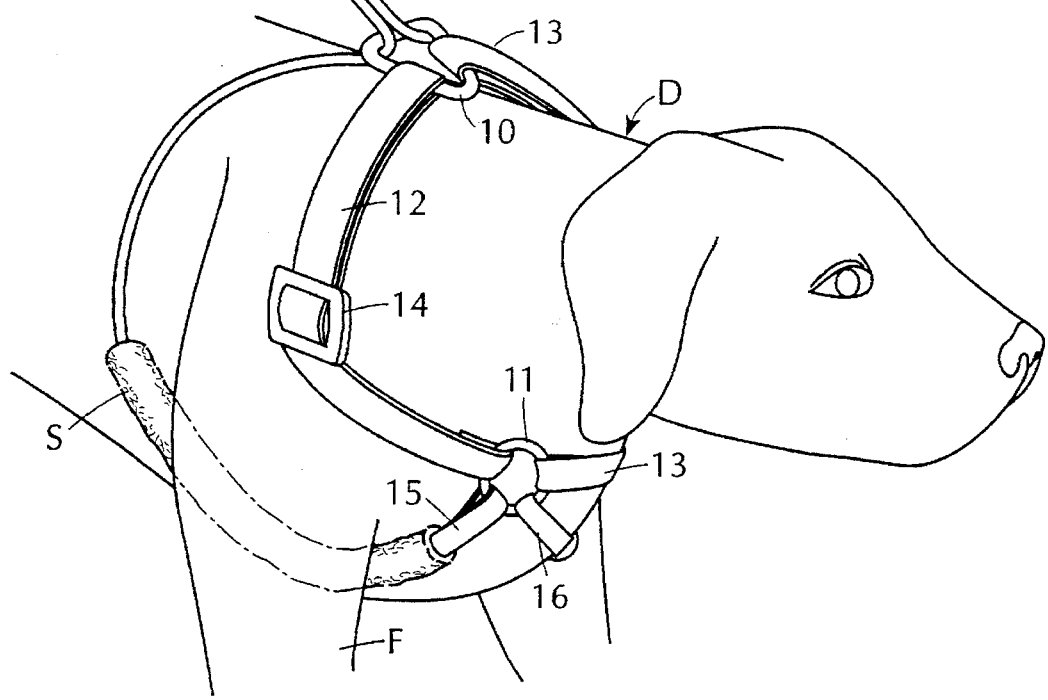
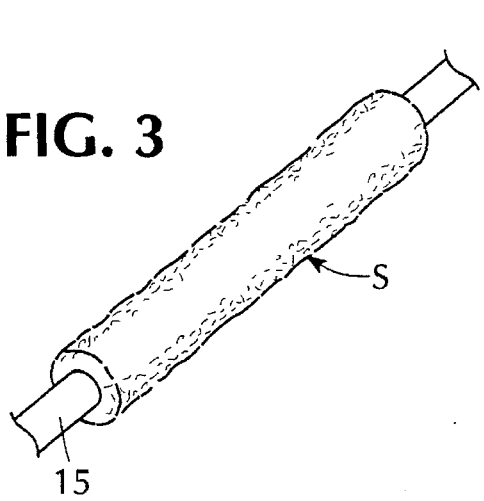
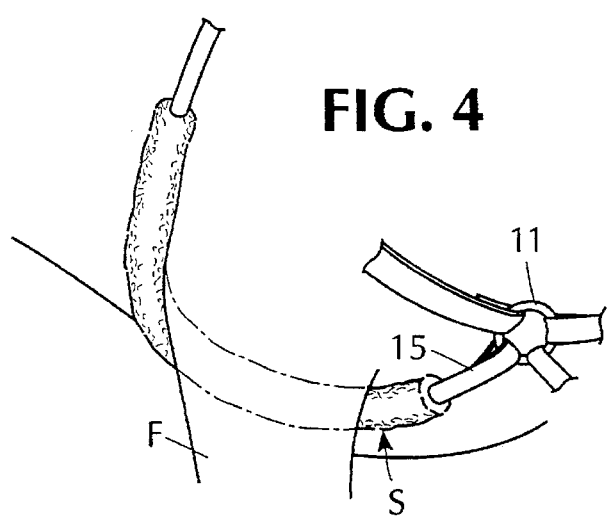

_5,660,146_

PROTECTIVE SLEEVES FOR DOG HARNESSES

RELATED APPLICATIONS

This application is a continuation-in-part of the application Ser. No. 08/280,195, filed Jul. 25, 1994, now U.S. Pat. No. 5,471,953 which is a continuation-in-part of application Ser. No. 08/222,034, filed Apr. 4, 1994, now U.S. Pat. No. 5,485,810 which is a continuation-in-part of application Ser. No. 08/194,720, filed Feb. 10, 1994, now U.S. Pat. No. 5,359,964 entitled "IMPROVED LEASH CONTROL DOG HARNESS."

BACKGROUND OF INVENTION

1. Field of Invention

This invention relates generally to leash-controllable dog harnesses adapted to inhibit a dog from straining against the leash, and more particularly to protective sleeves for such harnesses.

2. Status of Prior Art

In my prior U.S. Pat. Nos. 4,964,369, 5,359,964 and 5,329,885 there are disclosed various embodiments of a leash-controllable dog harness adapted to inhibit a dog from straining against the leash, without however producing a chocking action.

As pointed out in my prior patents, when a dog strains against a leash, it may in doing so wrest the leash from the hands of its master who then loses control of the dog. Should the master hold tightly onto the strained leash, he may then be pulled to the ground or be otherwise upset, with possible damaging consequences.

In the dog harnesses disclosed in my prior patents, the harness includes cables which pass through the respective left and right foreleg crotches of the dog. The arrangement is such that when the leash which is coupled to the cables is strained, the cables then ride up the crotches to engage the highly-sensitive foreleg pits and impose pressure thereon, the greater the strain, the greater the pressure. This pressure produces discomfort, and the dog is therefore induced to relieve this discomfort by relaxing the strain.

As pointed out in my prior U.S. Pat. No. 5,359,965, when the cables of the harness which pass through the foreleg crotches of the dog are tightened, they then rub against the skin of the dog, and with continued use of harness this action may cause chafing or irritation of the skin. To prevent such chafing without however interfering with the ability of the harness to control the dog, mounted on each cable in the region of the related crotch is a protective sleeve.

The sleeve disclosed in my prior U.S. Pat. No. 5,359,965 is composed of an inner liner formed of woven or knitted nylon or a similar smooth fabric, on which is anchored a coat of a natural fleece-like material, such as Sherpa, casmere wool or other soft, non-abrading natural material.

We have found that protective sleeves of the type disclosed in my prior patent are hospitable to vermin and serve as a breeding ground for the eggs and larvae of fleas and other vermin. Adult fleas of both sexes eat only blood and are external parasites to dogs. Flea eggs usually nest in the coat of a dog, the larvae feeding on organic material or the feces of adult fleas. Fleas of the type found on dogs also attack and infect humans. Hence a protective sleeve for a dog harness which is hospitable to vermin has serious drawbacks.

And while one can wash a sleeve of this type to remove vermin therefrom, when the outer coat of the protective sleeve is a natural fleece, this sleeve is difficult to wash and clean thoroughly. Also if the sleeve is dyed to impart an attractive color thereto, a natural fleece is not color fast, and the dye tends to stain the dog's skin or hair.

SUMMARY OF INVENTION

In view of the foregoing, the main object of this invention is to provide protective sleeves for the cables of a leash controllable harness which are inhospitable to vermin, hence the sleeves do not expose the dog on which the harness is installed to fleas and other harmful vermin.

More particularly, it is an object of this invention to provide sleeves of the above type formed of a synthetic plastic materials which are inhospitable to flea eggs and larvae, so that vermin will not breed or nest therein.

Among the significant features of a sleeve in accordance with the invention are the following:

A. The outer coat of the sleeve is formed of color-fast polyester fabric whose dye color will not migrate to and stain the dog on which the harness is installed.

B. The sleeve is washable and can be easily rendered clean and sterile.

C. The fabric sleeve is sewn in such a way as to prevent unravelling of its fibers and subsequent chaffing and irritation of the dog's skin.

Briefly stated, these objects are attained in protective sleeves for a leash-controllable dog harness provided with a pair of restraint cables that pass through the respective foreleg crotches of the dog and are coupled to the leash, whereby when the leash is strained, the cables then ride up the crotches to engage the sensitive foreleg pits and impose pressure thereon inducing the dog to release the strain in order to avoid the resultant discomfort. The sleeves which are mounted on the cables and conform thereto serve to prevent the cables from chafing or irritating the dog.

Each sleeve is formed by a smooth inner liner through which the cable is slidable, and a soft, outer coat anchored on the liner, both the inner liner and the coat being fabricated of synthetic plastic materials which are inhospitable to fleas and other vermin so that vermin troublesome to dogs cannot breed or nest on the sleeve.

BRIEF DESCRIPTION OF DRAWINGS

For a better understanding of the invention as well as other objects and further features thereof, reference is made to the following detailed description to be read in conjunction with the accompanying drawings, wherein:

FIG. 1 shows a dog harness installed on a dog, the harness having mounted on its cables protective sleeves in accordance with the invention;

FIG. 2 is a crosssection of the protective sleeve;

FIG. 3 shows the sleeve in place on a cable of the harness; and

FIG. 4 shows the sleeve in relationship to a foreleg crotch of the dog.

DESCRIPTION OF INVENTION

The Harness:

Referring now to FIG. 1, there is shown a dog D having left and right forelegs F. Installed on dog D is a harness that includes a shoulder junction 10 in the form of a metal ring placed on the shoulder of the dog intermediate the forelegs F. Also included is a ring-shaped chest junction 11 which lies adjacent the chest of the dog intermediate the crotches of the forelegs.

Extending between the shoulder and chest junctions 10 and 11 on opposite sides of dog D and joined at their ends to these junctions are straps 12 and 13. The length of the straps are adjustable by slides 14 to conform the harness to the size of the dog on which it is installed.

Also provided is a restraint cable 15 which is joined at one end to chest junction 11 and is extended therefrom to pass under the crotch of the right foreleg F, from which it runs up one side of the dog through an opening in the shoulder junction 10, and from there to a coupler 17 to which a leash 18 is attached. A second restraint cable 16 is joined to chest junction 11 and is extended therefrom to pass under the crotch of the left foreleg F from which it runs up the opposite side of the dog through an opening in the shoulder junction 10, and from there to the same coupler 17. The portions of cables 15 and 16 which extend between shoulder junction 10 and coupler 17 are maintained in parallel relation by a slidable clamp 19 which runs along these cables.

The harness illustrated in FIG. 1 is but one example of a leash-controlled harness of the types disclosed in my above-identified patents. All of these harnesses have a common feature which is that when the leash controlling the dog is strained, either by a leash holder who pulls on the leash, or by the dog who seeks to move forward at too fast a pace, the resultant strain on the leash causes cables 15 and 16 which pass through the foreleg crotches to ride up these crotches until the cables engage the highly-sensitive foreleg pits and impose pressure thereon.

This pressure induces dog D to relax the strain, and thereby avoid the discomfort resulting from the pressure applied to the foreleg pits.

Protective Sleeves:

As pointed out previously, when the leash coupled to the harness is strained, the restraint cables then ride up the foreleg crotches and in doing so the cables rub against the dog's skin. With continued use of the harness in the course of which the cables rub back and forth along the dog's skin, this action causes chafing and irritation, and may in time lead to a skin infection.

To prevent such chafing, mounted on each restraint cable in the region of the foreleg crotch is a protective sleeve S, as shown in FIGS. 2, 3 and 4. Sleeve S is formed of a tubular inner liner 20 on which is anchored a soft outer coat 21 which is interwoven with the inner liner.

When the restraint cable on which the sleeve is mounted is tightened, then it is the soft sleeve that makes rubbing contact with the skin of the dog, not the restraint cable which is protectively shielded by the sleeve.

Inner liner 20 is made of a woven or knitted nylon or other smooth fabric formed of synthetic plastic fibers of good tensile strength. It is important that the interior surface of the inner liner be smooth and have a low coefficient of friction, for the restraint cable must be free to slide easily within the sleeve and in doing so, not to shift the sleeve away from the foreleg crotch.

The outer coat 21 anchored on and interwoven with the inner liner 20 is formed of polyester fibers to create a fluffy, fleece-like coat which is soft and is also color-fast so that the dye which colors the outer coat does not run off the fabric and stain the dog's skin or hair.

And the sleeve is formed of synthetic plastic materials that are washable in a detergent bath so that the sleeve may be thoroughly cleaned an made free of dirt and bacteria, which if present would be transferred to the dog.

It is also necessary that the sleeve be formed of stretchable synthetic plastic fabric, so that in mounting the sleeve on a restraint cable having a buckle or other protruberance thereon, the sleeve can be stretched to pass the protruberance therethrough.

In manufacturing the sleeve, a fabric webbing which forms the inner liner and the outer coat anchored thereon is cut into flat blanks of a size appropriate to the sleeve. Each blank is then rolled into a tubular sleeve and the opposing ends of the blank are seamed together along seam line 22. The seam line is formed with both a loop lock stitch and with a straight stitch so as to prevent the unravelling of loose strands and a consequent irritation of the dog's skin. The stitching is carried out using a soft, non-abrasive filamentary thread for this purpose to prevent thread rubbing burns on the dog.

Thus protective sleeves in accordance with the invention are readily mountable on the restraint cables of the harness, and can easily be removed therefrom for washing. The most important advantage of these sleeves over those shown in my prior patents is that these sleeves are inhospitable to vermin and, therefore, vermin harmful to the dog cannot breed or nest on the sleeve.

While there has been shown and disclosed a preferred embodiment of protective sleeves for dog harness in accordance with the invention, it is to be understood that many changes may be made therein without departing from the spirit of the invention. Thus the synthetic fibers which form the outer coat of the sleeve may in practice be impregnated with a germicidal agent effective against vermin to enhance the anti-vermin properties of the sleeve. And instead of mounting the sleeve on the restraint cable of a harness it may be mounted on a dog collar so as to prevent the collar from chafing the neck of the dog.

I claim:

1. A protective sleeve in combination with a leash-controllable dog harness provided with a pair of restraint cables that pass through respective foreleg crotches of the dog each leading to a foreleg pit whereby when the leash is strained, the cables coupled to the leash are tightened and caused to ride up the foreleg crotches to impose pressure on the foreleg pits to induce the dog to relax the strain, each restraint cable having mounted thereon a protective sleeve comprising:

A. a tubular inner liner formed of synthetic plastic fibers, the liner having a smooth interior surface whereby said cable is easily slidable thereon; and B. an outer coat anchored on the inner liner formed of soft material whereby when the cable is tightened, the sleeve which then engages said foreleg pit shields the cable slidable therein to prevent chafing of the dog's skin.

2. A sleeve as set forth in claim 1, in which the inner liner is formed of woven or knitted nylon.

3. A sleeve as set forth in claim 1, in which the outer coat is formed of synthetic plastic fibers interwoven with the inner liner, said fibers being inhospitable to vermin.

4. A sleeve as set-forth in claim 3, in which the inner liner and the coat anchored thereon are stretchable.

5. A sleeve as set forth in claim 1, in which the sleeve is formed of color-fast synthetic plastic fibers whereby the color of the fibers does not run and stain the dog.

6. A sleeve as set forth in claim 5, in which the fibers forming the sleeve are washable.

7. A sleeve as set forth in claim 1, in which the sleeve is formed of a rectangular blank whose opposing ends are seamed together in a lock stitch and straight stitch pattern resistant to unravelling.

* * * * *